(12) United States Patent
Sauer

(10) Patent No.: US 7,533,899 B2
(45) Date of Patent: May 19, 2009

(54) DECORATIVE ELEMENT FOR COVER CAPS OF AIRBAG MODULES

(75) Inventor: Frank Sauer, Niedernberg (DE)

(73) Assignee: Takata-Petri AG, Aschaffenburg (DE)

( * ) Notice: Subject to any disclaimer, the term of this patent is extended or adjusted under 35 U.S.C. 154(b) by 280 days.

(21) Appl. No.: 10/791,711

(22) Filed: Mar. 4, 2004

(65) Prior Publication Data

US 2004/0174002 A1 Sep. 9, 2004

(30) Foreign Application Priority Data

Mar. 5, 2003 (DE) .............................. 203 04 056 U

(51) Int. Cl.
*B60R 21/20* (2006.01)
(52) U.S. Cl. .................................. 280/728.3
(58) Field of Classification Search .............. 280/728.2, 280/728.3, 731; 40/593
See application file for complete search history.

(56) References Cited

U.S. PATENT DOCUMENTS

| | | | |
|---|---|---|---|
| 5,082,310 A * | 1/1992 | Bauer | 280/732 |
| 5,577,767 A | 11/1996 | Nemoto | |
| 5,678,851 A | 10/1997 | Saito et al. | |
| 5,961,143 A | 10/1999 | Hlywka et al. | |
| 6,042,142 A | 3/2000 | Ricks | |
| 6,053,526 A | 4/2000 | Preisler et al. | |
| 6,132,662 A | 10/2000 | Preisler et al. | |
| 6,135,489 A | 10/2000 | Bowers | |
| 6,180,207 B1 | 1/2001 | Preisler et al. | |
| 6,209,905 B1 | 4/2001 | Preisler et al. | |
| 6,280,823 B1 | 8/2001 | Preisler et al. | |
| 6,391,242 B2 | 5/2002 | Preisler et al. | |
| 6,398,897 B1 | 6/2002 | Preisler et al. | |
| 6,692,016 B2 * | 2/2004 | Yokota et al. | 280/728.2 |
| 2001/0005541 A1 | 6/2001 | Iida et al. | |
| 2001/0023011 A1 | 9/2001 | Syrowik et al. | |
| 2002/0050704 A1 * | 5/2002 | Abe | 280/743.1 |
| 2003/0020263 A1 * | 1/2003 | Preisler | 280/728.3 |
| 2003/0178819 A1 * | 9/2003 | Schneider et al. | 280/728.3 |

FOREIGN PATENT DOCUMENTS

| | | |
|---|---|---|
| DE | 199 48 044 A1 | 5/2000 |
| DE | 199 25 546 A | 12/2000 |
| DE | 101 00 747 A | 8/2001 |
| DE | 100 37 208 A1 | 2/2002 |
| EP | 0 835 788 A | 4/1998 |
| EP | 0 899 170 A | 3/1999 |
| JP | 05139231 A * | 6/1993 |
| JP | 3004498 | 9/1994 |
| JP | 09183375 A * | 7/1997 |
| JP | 10-29488 A | 2/1998 |
| JP | 11-321516 A | 11/1999 |
| JP | 2000-71926 A | 3/2000 |
| JP | 2000-118344 A | 4/2000 |
| JP | 2001-162997 A | 6/2001 |
| JP | 2002-514544 | 5/2002 |

* cited by examiner

*Primary Examiner*—Faye M. Fleming
(74) *Attorney, Agent, or Firm*—Foley & Lardner LLP

(57) ABSTRACT

A decorative element for cover caps of airbag modules is provided. The decorative element includes predetermined breaking points and/or bending points. As a result of the predetermined breaking points and/or bending points, the decorative element tears together with the cover cap when an airbag is deployed.

22 Claims, 4 Drawing Sheets

DECORATIVE ELEMENT FOR COVER CAPS OF AIRBAG MODULES

BACKGROUND

The invention relates to a decorative element or emblem for an airbag module cover.

Cover caps of airbag modules, especially of driver airbag modules, are often provided with decorative elements. In the past, these have been manufactured for the most part as rigid elements from metal, for example from aluminum, or from plastic and have been provided, inter alia, with a decorative metal coating. These decorative elements lead to a stiffening of the airbag cap in the region in which the airbag emerges in the event of a crash. In the event of a crash, these stiff heavy decorative elements may result in considerable injuries to the occupant. Furthermore, if the airbag is triggered at low temperatures, there is the risk of fragmentation, particularly with regard to filigree decorative elements.

German laid-open publication 101 00 747 A1 (hereby incorporated by reference herein in its entirety) discloses an airbag cover, to which a flexible plaque is fastened. This plaque is preferably a soft film-covered plastic part. When this plaque is used, although the risk of an accident is reduced, nevertheless an uncontrolled breakage and loosening of the parts of the decorative element from the cover cap in the event of a crash cannot be ruled out, particularly in the case of large compact decorative elements, such as are increasingly used.

European patent application 0 899 170 A2 (hereby incorporated by reference herein in its entirety) discloses an airbag cover, to which logo structures consisting of narrow web-like elements are attached. These may both be connected to one another and be attached as individual elements. As a result, particularly with regard to the last-mentioned embodiment, admittedly, the risk of the loosening of parts in the event of a crash is greatly reduced. However, logo structures consisting of web-like elements are not always desired.

SUMMARY

According to an embodiment of the present invention, a decorative element for cover caps of airbag modules is provided. Predetermined breaking points and/or bending points are provided on the decorative element for a cover cap of an airbag module.

According to another embodiment of the present invention, a decorative element for an airbag module is provided. The decorative element comprises predetermined breaking points. The decorative element breaks at the predetermined breaking points.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Hereinafter, embodiments of the present invention will be described with reference to the attached drawings.

Figure 1:
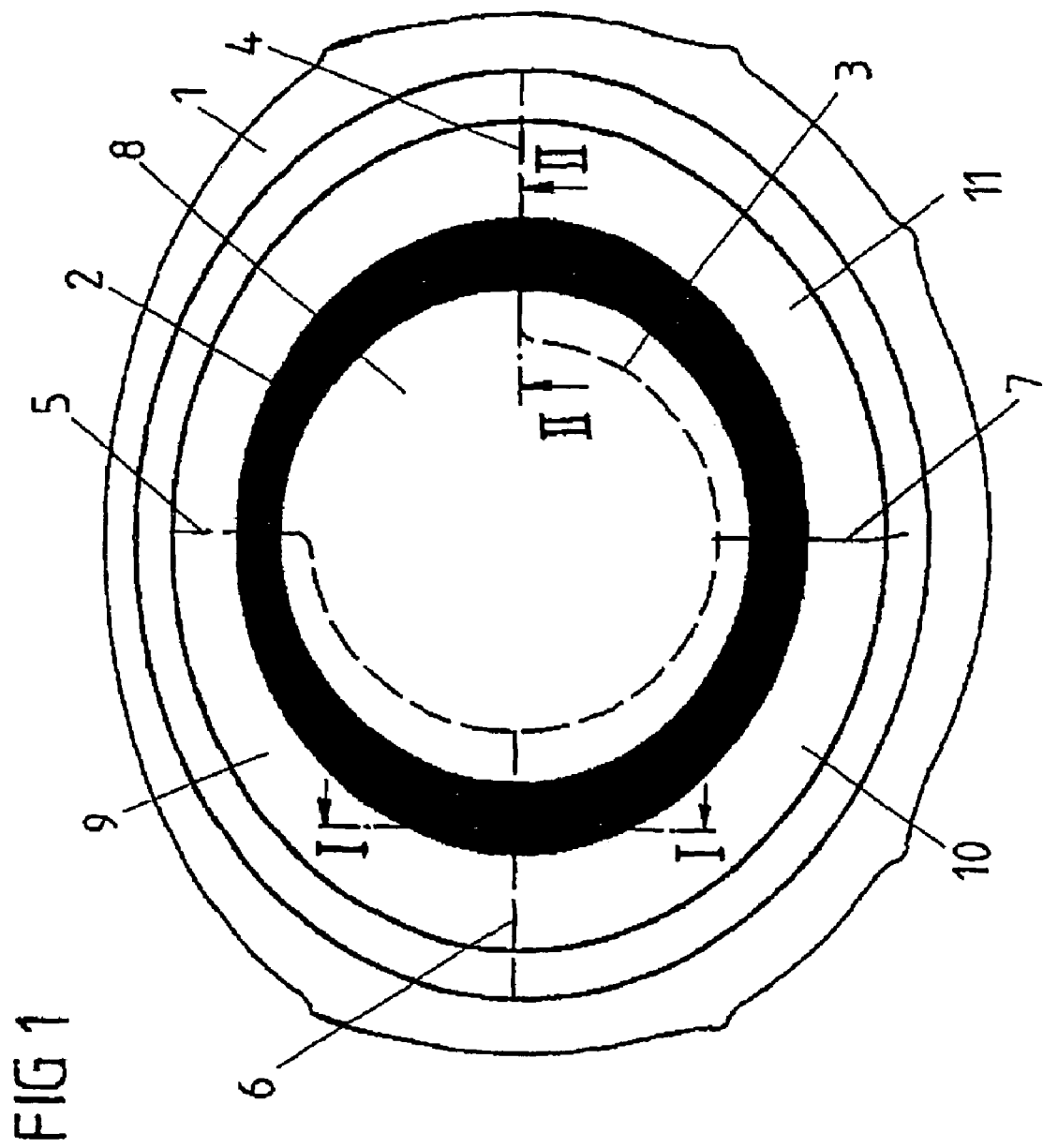
FIG. 1 shows a top view of an embodiment of a decorative element for a cover cap of an airbag module.

FIG. 1 illustrates an airbag cover cap 1 with a decorative ring 2 as a decorative element 2. The decorative ring 2 is fastened to the airbag cover cap 1 in a conventional manner. The cap 1 is provided with tear-open edges 3-7, so that the airbag cover cap can tear open in sections 8-11 when the airbag is triggered. The decorative element 2 has, at the locations of the tear-open edges 3-7, predetermined breaking points which run transversely through the decorative ring 2 at these locations according to the run of the tear-open edges 3-7. As a result, the decorative ring 2 tears together with the tear-open edges 3-7 of the airbag cover cap 1, so that, when the cover cap 1 tears open approximately one quarter of the decorative ring 2 remains at each of its sections. In another version of the decorative ring 2 or cover cap 1, other portions, for example one half to one eighth, of the decorative ring 2 could remain at the corresponding section.

Figure 2:
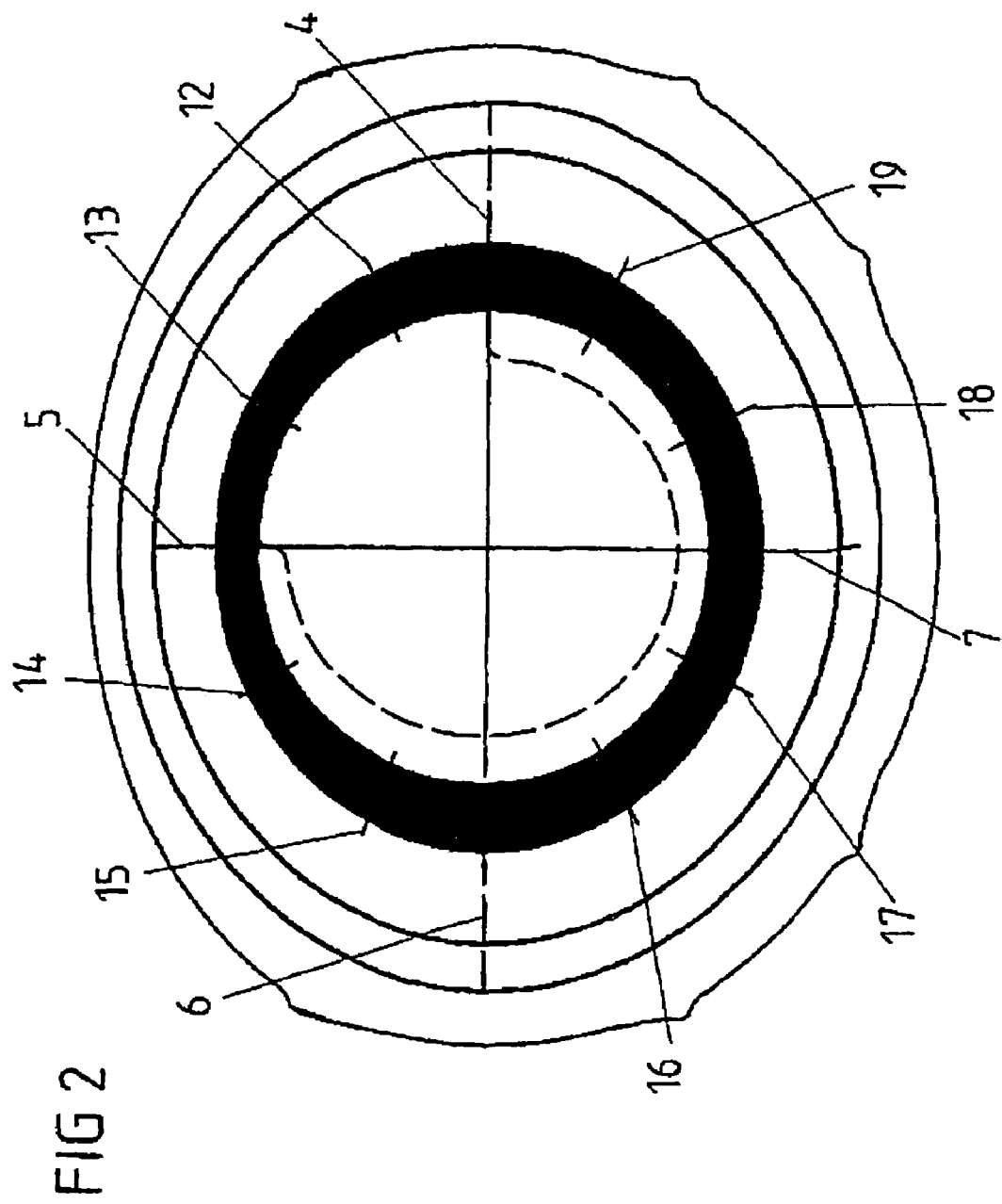
FIG. 2 shows a top view of another embodiment of a decorative element for a cover cap of an airbag module.

In the embodiment of FIG. 2, as in the embodiment of FIG. 1, predetermined breaking points are provided on the decorative element 2 at the locations of the tear-open edges 3-7. In addition, however, further predetermined breaking points or bending points 12-19 are provided on the decorative element 2 at locations where there are no tear-open edges. As a result, any deformations of the cover cap 1, such as occur when the airbag is triggered, can be copied by the decorative element 2, the consequence of this being that an uncontrolled breaking of the decorative element 2 can be avoided with a greater degree of probability.

Figure 3:
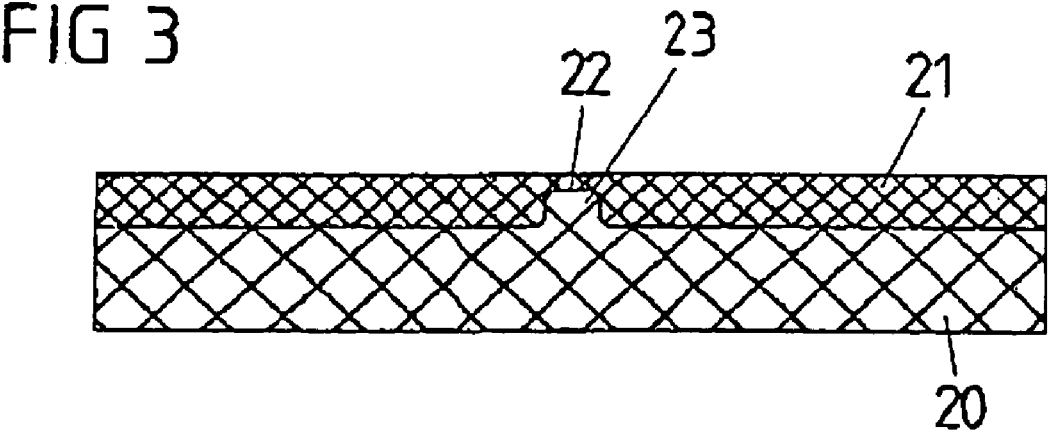
FIG. 3 shows a sectional view of an embodiment of a decorative element for a cover cap of an airbag module along sectional line 1-1 of FIG. 1.
Figure 4:
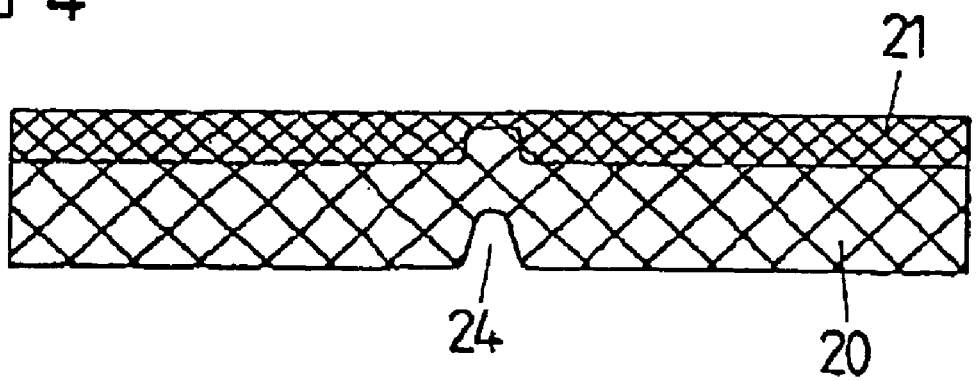
FIG. 4 shows a sectional view of an embodiment according to FIG. 3.
Figure 5:
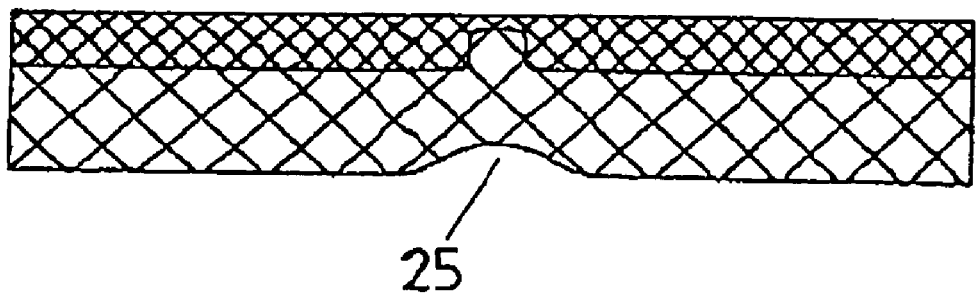
FIG. 5 shows a sectional view of an embodiment according to FIG. 3.

FIGS. 3 to 5 illustrate another embodiment in which, the predetermined breaking points can be formed in the case of a two-component decorative element 2. The element 2 has a soft carrier layer 20 and a harder covering layer 21. At the predetermined breaking point, the covering layer 21 has a groove 22 on its rear side, so that the covering layer 21 is weakened at this point. A projection 23 of the carrier layer 20, the projection 23 matching the cross section of the groove 22, engages into this groove 22. As a result of the weakening of the harder covering layer 21, the decorative element 2 will break at this point when the cover cap 1 is opened.

The embodiment of FIG. 4 corresponds to the embodiment of FIG. 3. In this embodiment, a groove 24 is additionally present in the carrier layer 20 at the location of the groove 22 of the covering layer 21 and, in the embodiment of FIG. 5, there is a material weakening 25 at the location of the groove 22. The preferred breaking of the decorative element 2 at the predetermined breaking point may be further promoted.

Figure 6:
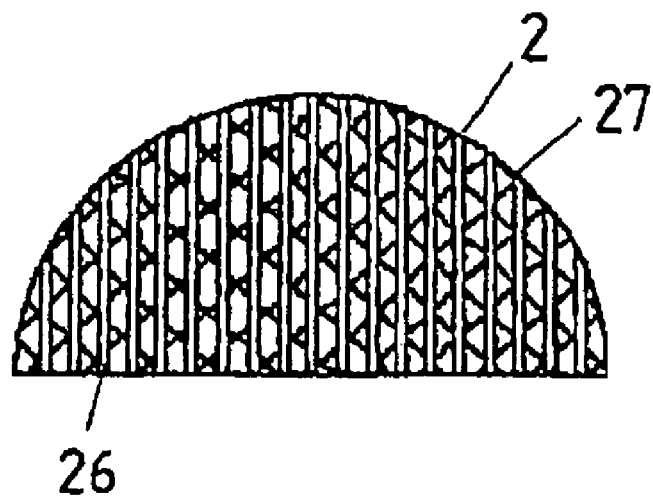
FIG. 6 show a cross sectional view of an embodiment of a decorative element along the sectional line 11-11 of FIG. 1.

In the embodiment of FIG. 6, a predetermined breaking point is achieved by means of perforations 26 in the decorative ring 2. The perforations 26 are produced continuously, so that they can be seen on the top side 27.

Figure 7:
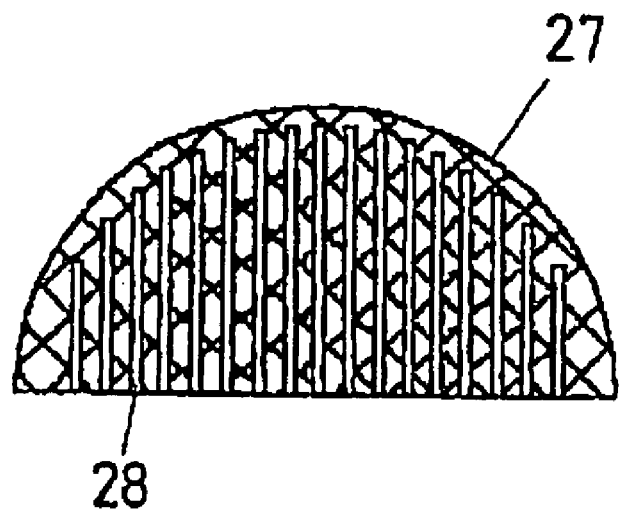
FIG. 7 show a cross sectional view of an embodiment of a decorative element along the sectional line 11-11 of FIG. 1.

In the embodiment of FIG. 7, perforations 28 are likewise provided. However, these perforations 28 are not produced continuously, but, starting from the rear side of the decorative ring 2, they end just below the top side 21, so that they cannot be seen on the top side 21 of the decorative ring 2.

An object on which the invention is based is, in the event of a crash, to reduce the risk of injury caused by decorative elements which are attached to cover caps of airbag modules, irrespective of the structure and size of such decorative elements.

Thus, in a decorative element 2 for cover caps 1 of airbag modules, according to an embodiment of the present invention, predetermined breaking points and/or bending points are provided. These are preferably provided in the region of the tear-open edges 3-7 of the cover cap. By predetermined breaking points and/or bending points being formed, the uncontrolled tearing of the decorative element 2 and the tearing-off of the element from the cover cap 1 are avoided as far as possible. The formation of predetermined breaking points and bending points is possible in the case of all decorative elements 2, regardless of their shape and size. However, the advantages are afforded, above all in the case of large-surface decorative elements 2.

In addition to the predetermined breaking points in the region of the tear-open edges of the cover cap, predetermined breaking points or bending points may also be provided outside this region, particularly in the case of large-surface decorative elements. This further reduces the risk of the uncontrolled breaking and tearing-off of parts of the decorative element due to the deformation of the cap surface when the airbag is triggered.

The predetermined breaking points may be designed differently. For example, in one embodiment, material weakenings, for example in the form of grooves, are provided in the decorative element at the predetermined breaking points. These material weakenings are preferably present on the rear side of the decorative element.

Furthermore, it is possible to provide perforations in the region of the predetermined breaking points. The perforations may extend from the rear side of the decorative element to just below the top side of the decorative element, so that the visible side of the decorative element remains unaffected. Continuous perforations may, however, also be provided. The perforations are preferably introduced by lasers, ultrasonic means or cutting.

In a decorative element, consisting of two components, a softer carrier material and a harder covering layer being provided, it is expedient for the covering layer to be weakened at the predetermined breaking point. In the case of material weakening on the rear side of the covering layer, it is expedient for the carrier material to engage into this material weakening. On account of the weakened harder covering layer, it becomes possible for the decorative element to break at the predetermined breaking point.

Furthermore, the controlled breaking of the decorative element of the predetermined breaking point is influenced positively, in that the decorative element consists of flexible plastic, for example of airbag cap material. Should a metallic surface be required, the surface of the decorative element may be provided with a metal layer applied by sputtering, or an electroplated surface may be provided. Furthermore, the surface may also be lacquered.

The priority application, DE 203 04 056.2, filed on Mar. 5, 2003, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air bag covering device comprising:
    a cover cap with tear-open edges; and
    a decorative element fastened to a surface area of the cover cap and covers at least one tear-open edge,
    wherein the decorative element comprises predetermined breaking points at locations where the decorative element covers the at least one tear-open edge, and
    wherein the decorative element has a surface area smaller than the surface area of the cover cap such that a portion of the surface area of the cover cap is exposed when the decorative element is fastened to the cover cap.

2. The air bag covering device according to claim 1, wherein the decorative element further comprises bending points provided outside a region of the tear-open edges of the cover cap.

3. The air bag covering device according to claim 1, wherein material weakenings are provided in the decorative element as the predetermined breaking points.

4. The air bag covering device according to claim 3, wherein grooves are provided as the material weakenings.

5. The air bag covering device according to claim 3, wherein the material weakenings are provided on a rear side of the decorative element contacting the cover cap.

6. The air bag covering device according to claim 1, wherein the decorative element comprises flexible plastic.

7. The air bag covering device according to claim 1, wherein a surface of the decorative element is provided with a metal layer applied by sputtering.

8. The air bag covering device according to claim 1, wherein a surface of the decorative element is provided with an electroplated coating.

9. The air bag covering device according to claim 1, wherein a surface of the decorative element is lacquered.

10. The air bag covering device according to claim 1, wherein the decorative element is configured to break at the predetermined breaking points when an airbag is deployed.

11. The air bag covering device according to claim 1, wherein the tear-open edges form tear-open sections; and
    wherein approximately one fourth of the decorative element remains at one of the tear-open sections when the decorative element tears.

12. The air bag covering device according to claim 1, wherein the tear-open edges form tear-open sections; and
    wherein approximately one half to one eighth of the decorative element remains at one of the tear-open sections when the decorative element tears.

13. The air bag covering device according to claim 1, wherein perforations are provided as the predetermined breaking points.

14. The air bag covering device according to claim 13, wherein the perforations extend from a rear side of the decorative element contacting the cover cap to just below a top side of the decorative element.

15. The air bag covering device according to claim 13, wherein the perforations are continuous.

16. The air bag covering device according to claim 15, wherein the continuous perforations are formed by lasers.

17. The air bag covering device according to claim 15, wherein the continuous perforations are formed by ultrasonic.

18. The air bag covering device according to claim 15, wherein the continuous perforations are formed by cutting.

19. The air bag covering device according to claim 1, wherein the decorative element comprises a softer carrier material and a harder covering layer; and
   wherein a material weakening as the breaking point is provided in the covering layer.

20. An air bag covering device comprising:
   a cover cap with tear-open edges; and
   a decorative element fastened to the cover cap and covers at least one tear-open edge,
   wherein the decorative element comprises predetermined breaking points at locations where the decorative element covers the at least one tear-open edge,
   wherein perforations are provided as the predetermined breaking points, and
   wherein the perforations extend from a rear side of the decorative element contacting the cover cap to just below a top side of the decorative element.

21. An air bag covering device comprising:
   a cover cap with tear-open edges; and
   a decorative element fastened to the cover cap and covers at least one tear-open edge,
   wherein the decorative element comprises predetermined breaking points at locations where the decorative element covers the at least one tear-open edge,
   wherein the decorative element comprises a softer carrier material and a harder covering layer;
   wherein a material weakening as the breaking point is provided in the covering layer, and
   wherein the softer carrier material is disposed between the harder covering layer and the cover cap such that the softer carrier material abuts the cover cap.

22. The air bag covering device according to claim 21, wherein a rear side of the covering layer includes the material weakening; and
   wherein the carrier material engages into the material weakening.

* * * * *